Nov. 4, 1969     L. F. PLUGGE     3,477,026
MOTOR ACCUMULATOR CIRCUIT
Filed Aug. 17, 1966     6 Sheets-Sheet 6

United States Patent Office 3,477,026
Patented Nov. 4, 1969

3,477,026
MOTOR ACCUMULATOR CIRCUIT
Leonard Frank Plugge, 15 Lowndes Square,
London SW. 1, England
Filed Aug. 17, 1966, Ser. No. 573,000
Int. Cl. H01m 45/04
U.S. Cl. 320—15                                       2 Claims

ABSTRACT OF THE DISCLOSURE

An electric circuit for a motor vehicle in which for supplying power to sparking plugs, automobile radios, lights and the like there are provided two electric storage accumulators. The accumulators are associated with switches which enable the user to supply energy from either one or both accumulators. At least one multiple position switch with four stator terminals and four positions of an armature is used for coupling the accumulators to the supply circuit. In the four positions of the armature one, the other, each and neither accumulator respectively is coupled to either the supply line in the motor vehicle or its earth return. Two such switches can be provided in an arrangement which has antitheft properties.

---

This invention relates to accumulator circuits and in particular to motor vehicle accumulator circuits and similar circuits for use as ignition circuits for internal combustion engines.

According to the present invention, a motor vehicle accumulator circuit comprises two supply terminals of different polarities, at least two electric storage cells or sets of cells and means for selectively connecting each cell or set of cells across said supply terminals.

The selecting means may be arranged so that the accumulator circuit may be supplied with electric power from any one or from any number of the storage cells. More particularly there may be at least two sets of cells, each constituting an accumulator; it would be possible to obtain power from either one or both sets of cells. Hitherto, as is well known, it has been the practice to use but a single storage battery in a motor vehicle. However, with the large quantity of electrical equipment present in the present day motor vehicles, the current drain on the accumulator is considerable and if any circuit is left on during periods when the accumulator is not being recharged, the accumulator very quickly loses its stored charge. Furthermore, there are often periods during a journey when the current drain on the accumulator is very severe. This can occur for example during periods of heavy discharge when starting the car or vehicle, repeated attempts at starting tending to drain the accumulator very quickly. With the present invention however a single accumulator may be used for normal journeys, a reserve accumulator being cut out of circuit so that if the first accumulator be of necessity or by chance completely discharged, there is not the danger that the user will be unable to use the car since there will be a reserve accumulator ready for use. Also, if the user realises that periods of high discharge are likely, such as when using a radio telephone, both accumulators may be connected in parallel so as to provide greater power during the period of heavy discharge. The present invention has a further advantage in that when the accumulators are connected in parallel, the combined internal resistance is lowered. Consequently, during periods of long journeys, it is possible to utilise the available power from a dynamo more efficiently since whereas in conventional dynamo circuits, the dynamo cuts out when the internal resistance becomes high and useful power is lost thereby, with the present invention the dynamo circuit will continue to charge the accumulator for the whole length of a run so that even if the current drain on the accumulators is considerable during the journey for example due to the use of lighting or other circuits, the accumulators will both remain fully charged. Furthermore, if any circuit is left on with both batteries in circuit, the current drain will take correspondingly longer to discharge both accumulators.

There may be means for selectively connecting each terminal of each accumulator to a respective one of the supply terminals. With this arrangement, both accumulators may be isolated from the vehicle's chassis, which usually forms one of the supply terminals, so that a powerful recharging unit may be used to recharge the accumulators without any danger of a short circuit or current leak on to the chassis. Alternatively, one set of like terminals may be connected by a bus-bar; there may be a simple switch arranged to connect the bus-bar to the respective supply terminal, which may be the motor vehicle's chassis. This would lead to a simplification of the accumulator circuit, the disposition of the accumulators with respect to the supply circuit being controlled by the switch means associated with the other terminals and the other supply terminal. In another arrangement, the bus-bar may constitute one of said supply terminals.

There may be a voltmeter arranged to be switched into circuit between the terminal of at least one accumulator and the supply terminal associated with the other terminal of the accumulator. In an arrangement with two switches the voltmeter may be selectively coupled to either accumulator or there may be two separate voltmeters so that the accumulator state of charge may be measured simultaneously. With the arrangement above, it is possible by moving only one of the master switches to determine the charge in the battery without connecting the battery to the supply system. Consequently, the reserve accumulator state of charge may be determined while the other is supply power to the circuits. Alternatively however a voltmeter may be connected between the two supply terminals so that it would be necessary to connect the accumulators separately or together to the supply terminals to determine the state of charge in each accumulator or both separately. The voltmeter or voltmeters may be arranged to be connected into a lamp circuit the lighting of the lamp giving a simple indication of which accumulator is in circuit. Very conveniently the lamp circuit may be in series with a push button switch operated when the bonnet of the vehicle or car is raised.

The switch means connecting corresponding accumulator terminals to a supply terminal may be combined in a single master switch, the switch having for example an armature with contacts connected to the respective terminals of the accumulators and to the supply terminal associated with these terminals, and having an armature which is arranged to selectively connect either or both or none of the battery terminals to the supply terminal. For example the armature may be a three pole armature having two opposite contacts both connected to an intermediate contact so that by rotating the armature which would have four contacts in a two battery system the four possibilities of connection of the accumulator to the supply may be realised successively.

It will be seen that the use of two accumulators, apart from providing a circuit which is more versatile than those using only one accumulator provides a degree of insurance against theft of the vehicle. For example the accumulators may be connected with one master switch closed so that lamp circuit or voltage sensing circuit still registers, but the accumulator is unconnected to the supply terminals at the same time. The other master switch could for example be in a hidden location in the vehicle so that the presence of power from that particular storage battery would give a misleading impression that the car could be used. This arrangement would be particularly suitable for use in cars having automatic transmission it being always necessary in such vehicles to start the car by using stored electric power since they cannot be pushed to turn the engine.

This invention may also provide an accumulator which can utilise selected sets of cells and according to this aspect of the invention, an electric storage accumulator having two supply terminals of different polarities is provided with at least two storage cells or sets of cells and means for selectively connecting each cell or sets of cells to the supply terminals.

In the following description, reference will be made to the accompanying drawings in which.

Figure 1:
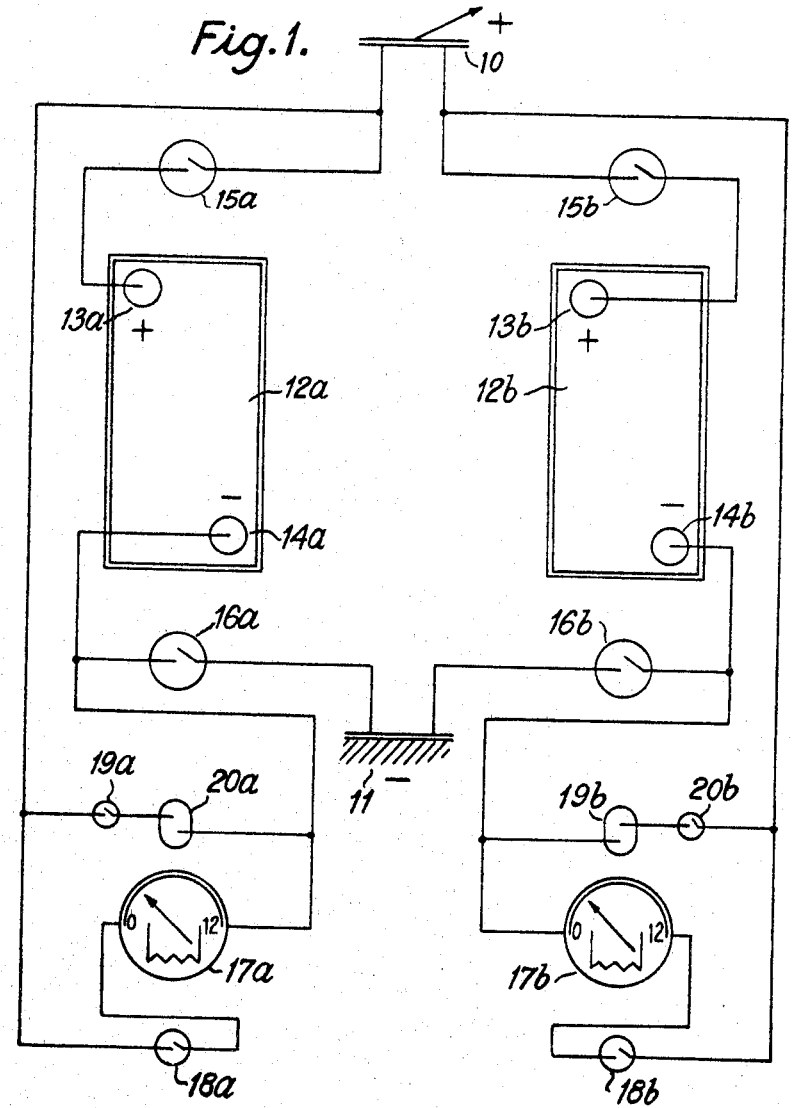
FIGURE 1 illustrates diagrammatically one form of accumulator circuit.

Referring firstly to FIGURE 1, there is shown an accumulator circuit having a positive supply terminal 10 and an earth return 11, the earth return being for example a vehicle chassis. Two conventional accumulators 12a and 12b having positive terminals 13a, 13b respectively and negative terminals 14a, 14b respectively are arranged to be connected between the supply terminals, the positive terminals being connected via the switches 15a and 15b respectively and the negative terminals through the switches 16a and 16b respectively. With the circuit as described, if it is desired to use only the accumulator 12a to supply power, the switches 15a and 16a will be closed and switches 15b and 16b will be open. For complete isolation from the supply all the switches 15 and 16 will be open. For both accumulators supplying power, all the switches will be closed. Between the terminals 10 and the negative terminal 14a is connected a voltmeter 17a in series with a switch 18a. This voltmeter may be used to measure the voltage of the accumulator by closing the switch 18a provided that the switch 15a is also closed. Furthermore, the value of the voltage output of accumulator 12a may be sensed on what is virtually a full loop, without disturbing the supply circuit which may be supplied with power from the accumulator 12b, the switches 15b and 16b being closed with also switch 15a closed but switch 16a open. The voltmeter circuit may be shunted by the lamp 20a by closing the switch 19a so that a simple indication of the state of accumulator 12a may be gauged. Very conveniently the switch 19a would be located in the chassis of the car such that it would close when the bonnet was lifted. Between the terminals 14b and 10, a similar lighting circuit comprising the switch 19b, the lamp 20b, voltmeter circuit 17b and switch 18b is connected. The operation of this circuit is similar to that associated with accumulator 12a.

Figure 2:
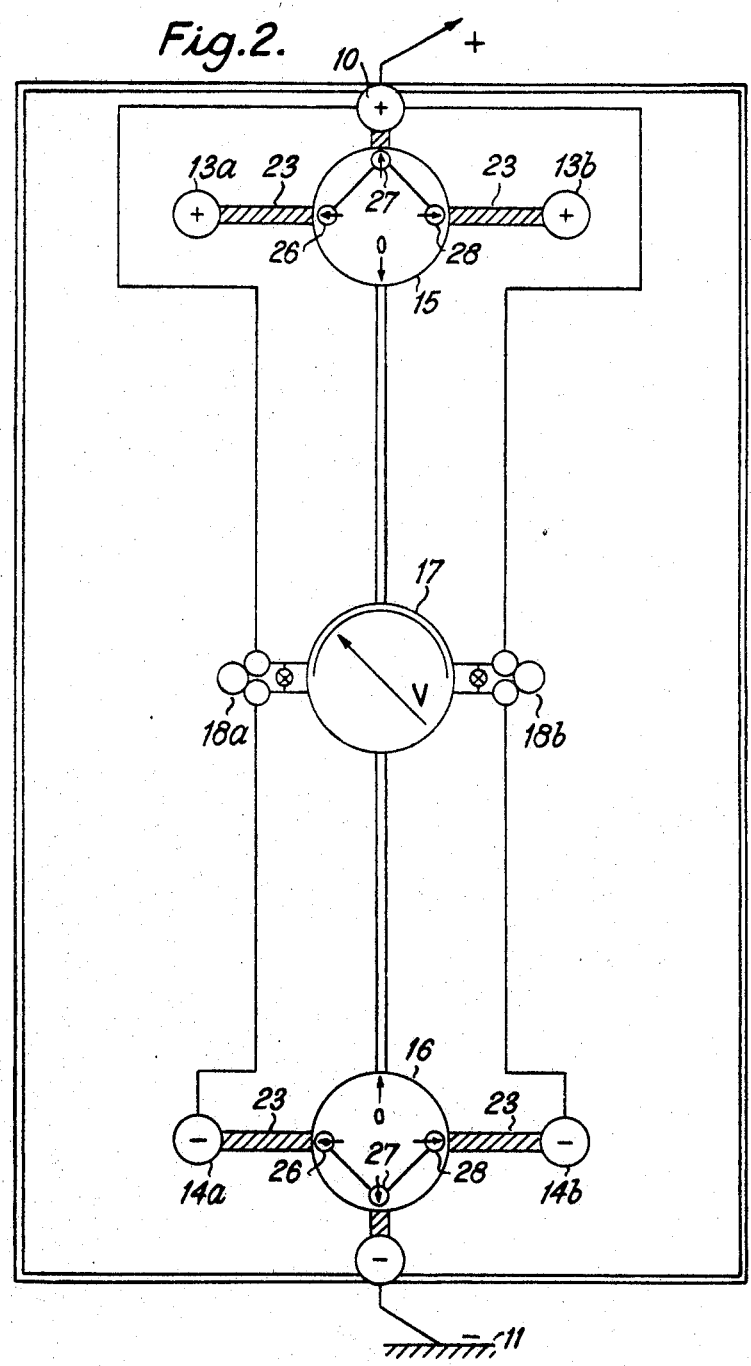
FIGURE 2 illustrates modification of the circuit of FIGURE 1.

FIGURE 2 shows a modification of the circuit shown in FIGURE 1. In this figure only the supply terminals of the accumulators are shown; in this circuit, the voltmeter 17 has double terminals so that it may be used to sense the voltage between the terminal 10 and the terminal 14a or between the terminal 10 and the terminal 14b. For this purpose, the switches 18a and 18b may be selectively closed so as to supply current to the voltmeter terminals. In FIGURE 2, the switches 15a and 15b have been combined in single switch 15 and the switches 16a and 16b combined in the single switch 16. These switches, hereinafter referred to as motor switches, have contacts connected by heavy duty bus-bars 23 to the respective supply terminal and to the respective accumulator terminals. The armature of each switch has three contacts 26, 27 and 28 two opposite contacts 26 and 28 both being connected to the intermediate contact 27 so that as the armature is rotated, either, both or neither accumulator may be connected successively to the supply terminal.

Figure 3:
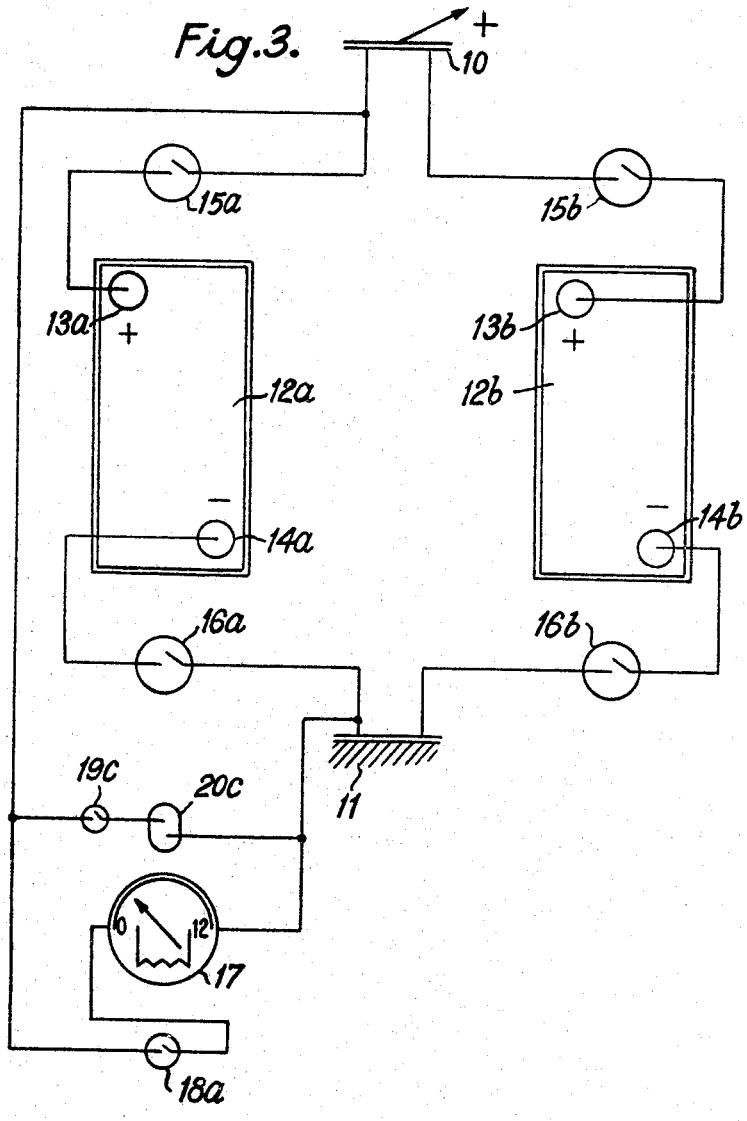
FIGURE 3 illustrates diagrammatically another form of accumulator circuit.
Figure 4:
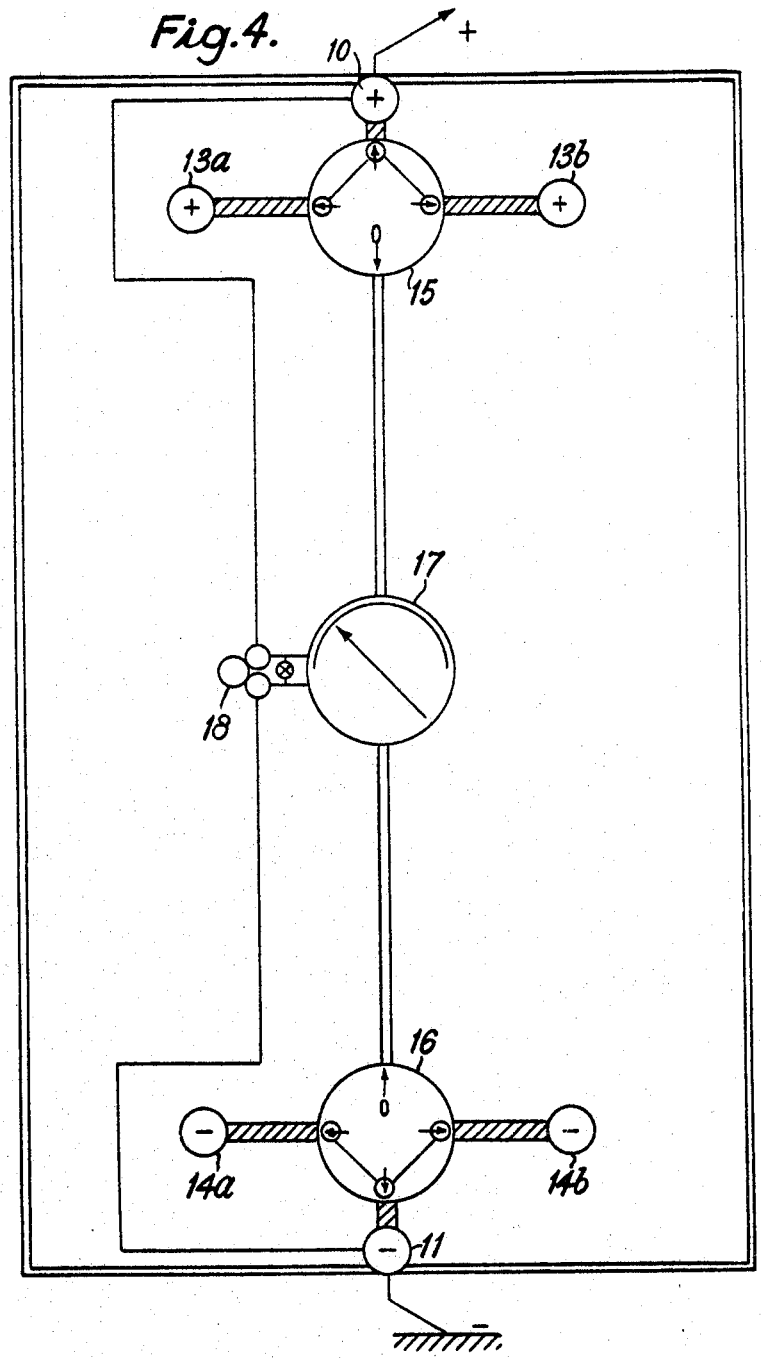
FIGURE 4 illustrates the circuit of FIGURE 3 in more detail.

FIGURE 3 shows a modification of the circuit shown in FIGURE 1 in which the voltmeter 17 is connected between the supply terminals 10 and 11. With this arrangement, if the user wishes to determine the charge in the accumulator, it is necessary to connect the accumulator into the supply circuit by the closing of the switches 15a and 16a or 15b and 16b respectively. FIGURE 4 shows the circuit of FIGURE 3 utilising the master switches 15 and 16 and having the lighting circuit 17 and 18 in parallel with the voltmeter.

Figure 5:
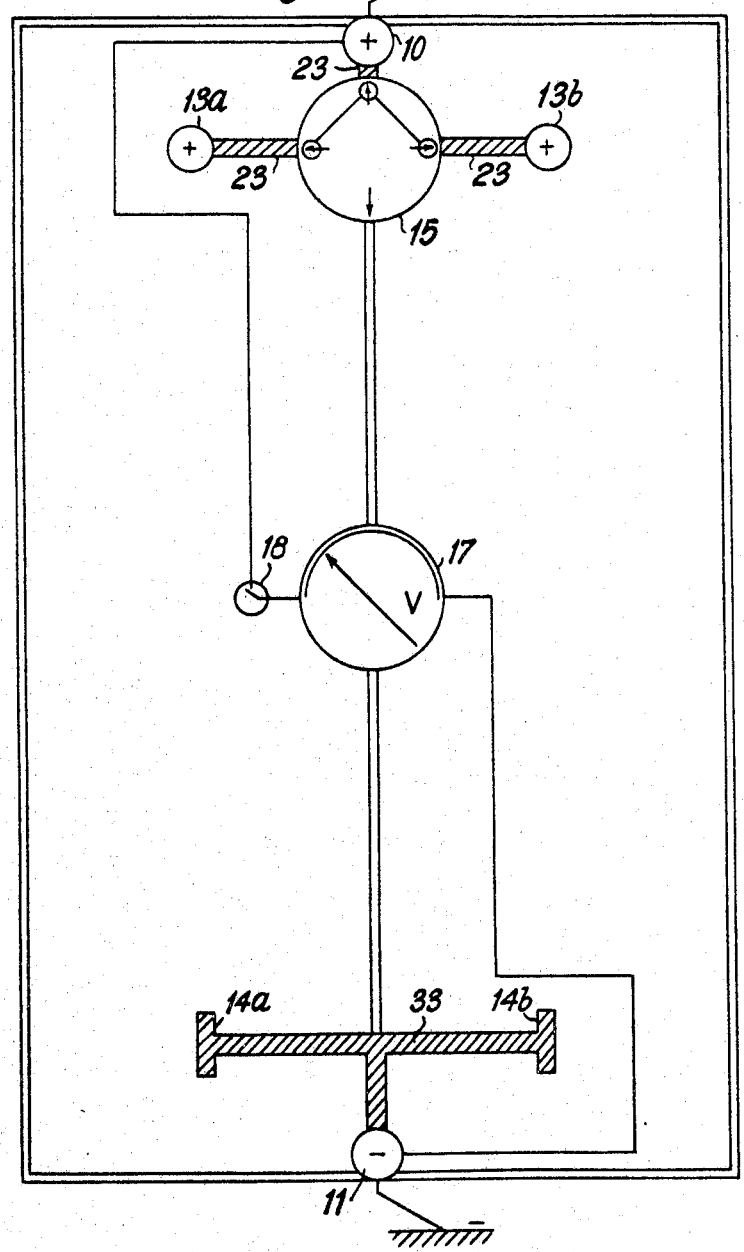
FIGURE 5 illustrates diagrammatically yet another form of accumulator circuit.

FIGURE 5 shows a modification of the circuit in which one of the master switches has been replaced by the bus-bar 33 connecting the respective accumulator terminals and the supply terminal. Following conventional practice, this has been done for the lower switch 16 since in electric circuits it is desirable to have the master switch in the live wire rather than the earth return. With this circuit, the voltmeter circuit is connected between the earth return 11 and the supply circuit with the switch 18 in series with the voltmeter.

Figure 6:
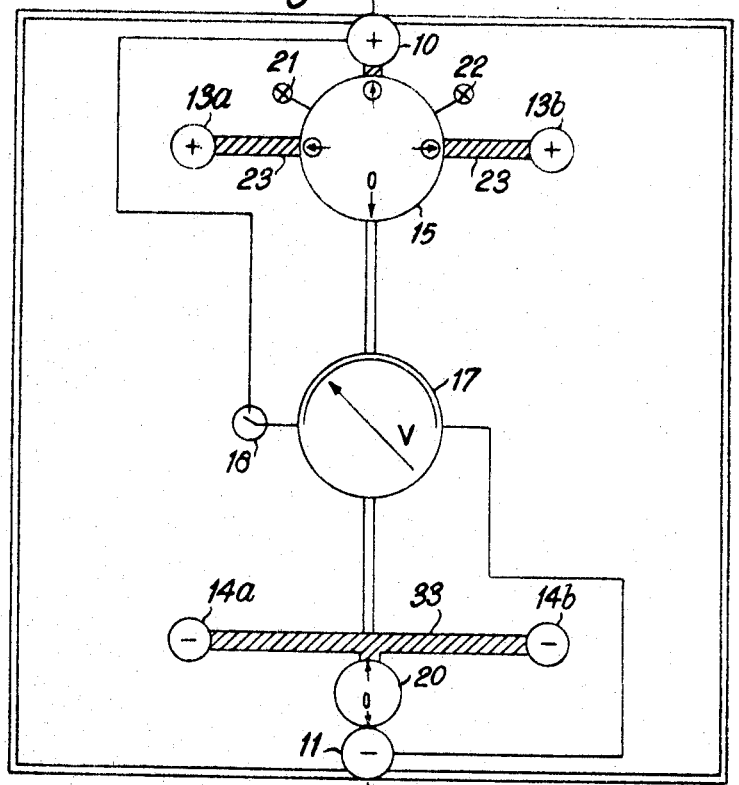
FIGURE 6 illustrates a modification of the circuit of FIGURE 5.

FIGURE 6 shows a further modification of the circuit shown in FIGURE 5. The circuit has been modified to the extent that an additional switch, a two position switch, 20 has been added between the lower bus-bar and the earth return terminal. Furthermore, additional lamps 21 and 22 have been associated with the master switch so that the respective lamps are connected when the respective battery terminal is connected to the supply terminal 10. It will be apparent that this feature could be incorporated in the circuits previously mentioned, to indicate whether the respective accumulator is in circuit.

It will be apparent that many other arrangements are possible using two or more accumulators.

Figure 7A:
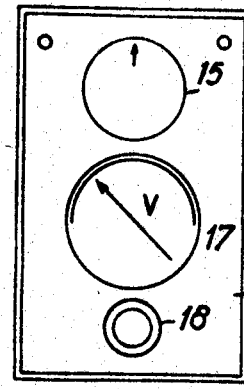
FIGURE 7 illustrates a master switch.
Figure 7B:
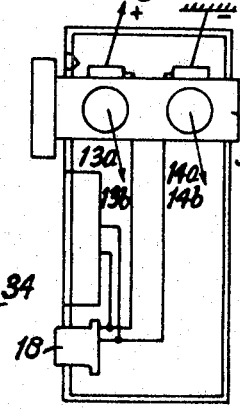
Figure 7C:
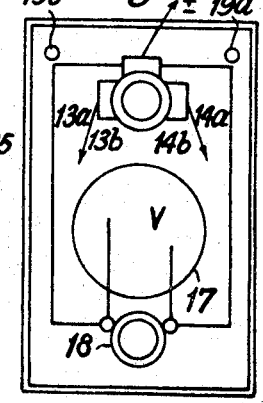

A master switch 15 is illustrated in FIGURES 7a, 7b and 7c, and includes a casing 34 housing the voltmeter 17 and a switch 18 as well as the switch 15. The armature 35 carries three pairs of contacts in three adjacent quadrants of the armature periphery. The first contact in each pair contacts successively the positive terminal of one accumulator, the supply positive and the positive terminal of the other accumulator, whereas the second contact in each pair successively contacts the negative terminal of the first accumulator, the earth return and the other accumulator's negative terminal. A fourth position of the armature leaves the accumulators both isolated. With this switch, the voltmeter 17 and switch 18 are connected between supply terminal 10 and the earth return 11.

I claim:
1. In a motor vehicle, the combination comprising:
   an electricity supply terminal;
   an earth return;
   first and second selectable switch means;
   first and second accumulators, said accumulators each having respective first and second terminals of opposite polarity;
   said first terminals of said first and second accumulators being coupled to said earth return;
   said second terminal of said first accumulator being coupled to said supply terminal through said first selectable switch means and said second terminal of said second accumulator being coupled to said supply terminal through said second selectable switch means, said first and second selectable switch means together comprising a multiple position switch having first, second third and fourth stator terminals and an armature having four switch positions, said rotor in each of said four switch positions coupling a different group of three of said stator terminals in common;

said first, second and third stator terminals being connected respectively to said second terminal of said first accumulator, said second terminal of said second accumulator, and said electricity supply terminal, and said fourth stator terminal being isolated from all the terminals to which said first, second and third stator terminals are connected.

2. The structure defined in claim 1 further comprising a further multiple position switch as defined above, the first, second and third stator terminals of said further multiple position switch being connected respectively to said first terminal of said first accumulator, said first terminal of said second accumulator and said earth return; the fourth stator terminal of said further multiple position switch being isolated from all the terminals to which the first, second and third terminals of said further multiple position switch are connected.

References Cited
UNITED STATES PATENTS

| | | | |
|---|---|---|---|
| 2,566,969 | 9/1951 | Sorensen | 320—15 X |
| 3,258,670 | 6/1966 | Piechon | 320—6 |
| 3,307,096 | 2/1967 | Lyon | 320—15 |
| 404,968 | 6/1889 | Griscom | 307—18 X |
| 2,998,776 | 9/1961 | Morgan | 320—15 X |
| 3,340,402 | 9/1967 | Curtis | 307—10 X |

JOHN F. COUCH, Primary Examiner

S. WEINBERG, Assistant Examiner

U.S. Cl. X.R.

307—10, 80